United States Patent
Tanoue et al.

(10) Patent No.: US 11,632,960 B2
(45) Date of Patent: Apr. 25, 2023

(54) PLANT GROWTH PROMOTER

(71) Applicant: KAO CORPORATION, Tokyo (JP)

(72) Inventors: Akihiro Tanoue, Wakayama (JP); Yumi Mochizuki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 332 days.

(21) Appl. No.: 16/651,977

(22) PCT Filed: Oct. 16, 2018

(86) PCT No.: PCT/JP2018/038517
§ 371 (c)(1),
(2) Date: Mar. 27, 2020

(87) PCT Pub. No.: WO2019/078207
PCT Pub. Date: Apr. 25, 2019

(65) Prior Publication Data
US 2020/0253218 A1 Aug. 13, 2020

(30) Foreign Application Priority Data
Oct. 17, 2017 (JP) .............................. JP2017-200919

(51) Int. Cl.
| | |
|---|---|
| *A01N 25/00* | (2006.01) |
| *A01N 65/00* | (2009.01) |
| *A01G 7/06* | (2006.01) |
| *C05F 11/10* | (2006.01) |
| *C05G 3/00* | (2020.01) |

(52) U.S. Cl.
CPC .............. *A01N 65/00* (2013.01); *A01N 25/00* (2013.01)

(58) Field of Classification Search
CPC .......... A01N 65/00; A01N 25/00; A01G 7/06; C05F 11/10; C05G 3/00
See application file for complete search history.

(56) References Cited

U.S. PATENT DOCUMENTS

2020/0045983 A1    2/2020    Tsuno et al.

FOREIGN PATENT DOCUMENTS

| AU | 2003301437 A1 | 5/2004 |
|---|---|---|
| AU | 2003301437 B2 | 5/2004 |
| CA | 3055061 A1 | 9/2018 |
| CN | 1268531 A | 10/2000 |
| CN | 102260503 A | 11/2011 |
| CN | 105036912 A | 11/2015 |
| CN | 105860978 A | 8/2016 |
| CN | 105918364 A | 9/2016 |
| CN | 107011080 A | 8/2017 |
| CN | 107197883 A | 9/2017 |
| JP | 2000-229311 A | 8/2000 |
| JP | 2003-321304 A | 11/2003 |
| JP | 2004-236530 A | 8/2004 |
| JP | 2004-285033 A | 10/2004 |
| JP | 2012-52129 A | 3/2012 |
| JP | 2012-157299 A | 8/2012 |
| KR | 2000-0057885 A | 9/2000 |
| WO | WO-9827830 A1 * | 7/1998 ............. A23K 40/30 |
| WO | WO 2018/159393 A1 | 9/2018 |

OTHER PUBLICATIONS

International Search Report for PCT/JP2018/038517 (PCT/ISA/210) dated Dec. 11, 2018.
Combined Chinese Office Action and Search Report dated Feb. 26, 2021 in Patent Application No. 201880066588.7 (with partial English translation).
International Preliminary Reparton Patentability and the English translation of the Written Opinion of the International Searching Authority, dated Apr. 30, 2020, for International Application No. PCT/JP2018/038517.
Combined Office Action and Search Report dated Apr. 27, 2022 in Chinese Patent Application No. 201880066588.7 (with English translation of the Office Action), 11 pages.
Combined Office Action and Search Report dated Oct. 9, 2021 in Chinese Patent Application No. 201880066588.7 (with English translation of the Office Action), 9 pages.
Yingliang Wei et al. "Physical Chemistry (Edition II)", Applied Technology University Textbook Series, China Environment Press, Beijing, Aug. 31, 2014, pp. 374-375 (with partial English translation).

(Continued)

*Primary Examiner* — Alton N Pryor
(74) *Attorney, Agent, or Firm* — Element IP, PLC

(57) ABSTRACT

The present invention is a plant growth promoter, containing:
a lignocellulosic biomass (A); and
at least one base (B) selected from the following (B1) to (B3),
wherein the plant growth promoter has a contact angle with water of 80° or less,
<Base (B)>
(B1) a resin acid,
(B2) a compound represented by formula (1), $$R^1-Z^1-Z^2 \qquad (1)$$

wherein
$R^1$ represents a hydrocarbon group with 9 or more carbons,
$Z^1$ represents a single bond or $(OR^2)_p$,
$R^2$ represents an alkanediyl group with 2 or more and 3 or less carbons,
p represents a number that is on average more than 0 and 30 or less,
$Z^2$ represents a group selected from a carboxy group, a hydroxyl group, a sulfate group, and $NR^3R^4$,
$R^3$ and $R^4$ each independently represent a hydrogen atom, a methyl group, an ethyl group, or $(R^5O)_qH$,
$R^5$ represents an alkanediyl group with 2 or more and 3 or less carbons, and
q represents a number that is on average more than 0 and 15 or less, and
(B3) a polyhydric alcohol or a polycarboxylic acid having a molecular weight of 30,000 or less.

16 Claims, No Drawings

(56) References Cited

OTHER PUBLICATIONS

Yuxian Xing, "Principles and Techniques of Soilless Culture", Agriculture Press, Jun. 30, 1990, p. 125 (with partial English translation).

* cited by examiner

PLANT GROWTH PROMOTER

FIELD OF THE INVENTION

The present invention relates to a plant growth promoter, a method for producing a plant growth promoter, and a method for growing a plant.
fsy

BACKGROUND OF THE INVENTION

Various nutritional factors are necessary for plant growth. A shortage of some of the factors is known to hinder plant growth. For example, three major fertilizer factors are: nitrogen which is a component element of proteins; phosphorus which is not only a constituent element of nucleic acids or phospholipids but plays an important role in energy metabolism and synthesis or decomposition reactions of substances; and potassium which has physiological action of substance metabolism or mass transfer. A shortage of these major components generally depauperates plant growth. Calcium is an important component constituting plant bodies and cells and also plays an important role in maintaining the balance of the metabolic system. Therefore, deficiency in calcium causes physiological disorders. In addition, various nutrients such as Mg, Fe, S, B, Mn, Cu, Zn, Mo, Cl, Si, and Na are necessary for plants.

These nutritional components such as nitrogen, phosphorus, and potassium are applied in the form of a base fertilizer or an additional fertilizer, or a liquid fertilizer is diluted and provided by soil drench or foliar spray. Although these fertilizers are essential for plant growth, the application of the fertilizers beyond certain concentrations cannot contribute to improvement in the growability and yields of plants.

However, an important challenge to agricultural production is to increase yields by promoting the growth of agricultural crops and increasing harvests per unit area. For this purpose, various necessary plant growth regulators have been developed and utilized. The plant growth regulators represented by gibberellin, auxin, and the like are used for regulating growth such as sprouting, rooting, elongation, flower formation, or fruit setting, and morphogenic reaction. However, these substances have multifaceted and complicated actions and limited applications.

Various techniques considered to lead to the growth promotion of agricultural crops have heretofore been proposed. In fields where agricultural crops are to be cultivated, soil properties are important factors in terms of productivity and the like, and studies are being carried out to increase productivity by improving soil properties.

JP-A 2012-52129 describes a method for applying a soil stabilizer to soil, the method including a step of adding the soil stabilizer to a solid carrier, a step of applying the solid carrier to the soil, a step of applying water to the solid carrier, and a step of releasing the soil stabilizer from the solid carrier into the soil.

JP-A 2004-236530 describes a method for improving seed germination or plant growth by sowing or cultivating in a culture soil in which 0.0001 to 0.5 parts by weight of a water-soluble cellulose derivative are mixed with 100 parts by weight of soil. It is also disclosed that soil and the water-soluble cellulose derivative are mixed to produce aggregates and improve seed germination or plant growth.

JP-A 2012-157299 describes a method for applying a soil-conditioning material in which, when ethanol is produced by the steps of saccharifying a substrate formed of a biomass with a saccharification enzyme to obtain a saccharification solution, fermenting the obtained saccharification solution to obtain a fermentation solution, and then distilling the fermentation solution, a saccharification residue included in the saccharification solution is separated, a distillation residue left after distilling the fermentation solution is recovered, and the saccharification residue or the distillation residue is applied to soil as the soil-conditioning material, characterized in that after the saccharification residue or the distillation residue is applied to the soil, the soil is maintained in an oxidization state during an effective accumulated temperature of 20 to 1,500° C./day.

JP-A 2000-229311 describes a biodegradable material composition composed from a mixed material obtained by mixing a plant raw material powder of a plant raw material composed mainly of rice husks and a biodegradable substance including a binder.

SUMMARY OF THE INVENTION

The present invention provides a plant growth promoter that does not cause phytotoxicity or the like in plants and exhibits an excellent growth promoting effect on plants such as agricultural crops.

The present invention relates to a plant growth promoter, including:
 a lignocellulosic biomass (A); and
 at least one base (B) selected from (B1) to (B3),
 wherein the plant growth promoter has a contact angle with water of 80° or less,
 <Base (B)>
 (B1) a resin acid,
 (B2) a compound represented by formula (1)

$$R^1\text{—}Z^1\text{—}Z^2 \qquad (1)$$

[wherein
 $R^1$ represents a hydrocarbon group with 9 or more carbons,
 $Z^1$ represents a single bond or $(OR^2)_p$,
 $R^2$ represents an alkanediyl group with 2 or more and 3 or less carbons,
 p represents a number that is on average more than 0 and 30 or less,
 $Z^2$ represents a group selected from a carboxy group, a hydroxyl group, a sulfate group, and $NR^3R^4$,
 $R^3$ and $R^4$ each independently represent a hydrogen atom, a methyl group, an ethyl group, or $(R^5O)_qH$,
 $R^5$ represents an alkanediyl group with 2 or more and 3 or less carbons, and
 q represents a number that is on average more than 0 and 15 or less], and
 (B3) a polyhydric alcohol or a polycarboxylic acid having a molecular weight of 30,000 or less.

Further, the present invention relates to a method for producing a plant growth promoter, including the following step 1 and step 2:
 Step 1: a step of hydrophilically treating lignocellulosic biomass (A) to obtain hydrophilic lignocellulosic biomass (A'); and
 Step 2: obtaining a mixture containing hydrophilic lignocellulosic biomass (A') obtained in step 1 and at least one base (B) selected from the following (B1) to (B3) and having a contact angle with water of 80° or less,
 <Base (B)>
 (B1) a resin acid,
 (B2) a compound represented by formula (1), $$R^1\text{—}Z^1\text{—}Z^2 \qquad (1)$$

[wherein

R$^1$ represents a hydrocarbon group with 9 or more carbons, Z$^1$ represents a single bond or (OR$^2$)$_p$, R$^2$ represents an alkanediyl group with 2 or more and 3 or less carbons, p represents a number that is on average more than 0 and 30 or less, Z$^2$ represents a group selected from a carboxy group, a hydroxyl group, a sulfate group, and NR$^3$R$^4$, R$^3$ and R$^4$ each independently represent a hydrogen atom, a methyl group, an ethyl group, or (R$^5$O)$_q$H, R$^5$ represents an alkanediyl group with 2 or more and 3 or less carbons, and q represents a number that is on average more than 0 and 15 or less], and (B3) a polyhydric alcohol or a polycarboxylic acid having a molecular weight of 30,000 or less.

In addition, the present invention relates to a method for growing a plant, wherein the plant is cultivated in a soil containing the plant growth promoter of the present invention.

According to the present invention, there are provided a plant growth promoter, a production method thereof, and a method for growing a plant, which exhibit an excellent growth promoting effect on a plant such as an agricultural crop without causing phytotoxicity in the plant. Yield can be improved by applying the plant growth promoter of the present invention to, for example, an agricultural crop.

EMBODIMENTS OF THE INVENTION

<Plant Growth Promoter>

The plant growth promoter of the present invention contains lignocellulosic biomass (A) and at least one base (B) selected from the above (B1) to (B3), wherein the contact angle with water is 80° or less.

[Lignocellulosic Biomass (A)]

Lignocellulosic biomass (A) is a biomass including cellulose, hemicellulose, and lignin as main components. Lignocellulosic biomass (A) is preferably selected from plant biomass. Examples of the plant biomass include herbaceous biomass and ligneous biomass. Among these, herbaceous biomass is preferable.

The term "herbaceous biomass" means plant raw materials other than trees growing on grassland, or non-ligneous plant sites. Specific examples include plant materials of Gramineae, Malvaceae, and Leguminosae, and non-ligneous materials of plants of Palmae.

Examples of the plant materials of Gramineae include bagasse such as sugarcane bagasse and sorghum bagasse, switchgrass, elephant grass, corn stover, corncob, rice straw, wheat straw, barley, Japanese pampas grass, grass, Johnson grass, Erianthus, and napier grass. Examples of the plant materials of Malvaceae include kenaf and cotton plant. Examples of the plant materials of Leguminosae include alfalfa. Examples of the non-ligneous materials of Palmae include empty fruit bunches of oil palm.

Among these, from a viewpoint of productivity and handleability, the plant materials of Gramineae are preferable, sugarcane bagasse, corncob and rice straw are more preferable, and sugarcane bagasse is further preferable.

Examples of the ligneous biomass include various woods such as wood chips obtained from conifer such as Japanese larch and bald cypress, and broadleaf trees such as oil palm and Japanese cypress; and wood pulp produced from these woods.

These plant biomass may be used singly or in combination of two or more.

Lignocellulosic biomass (A) is preferably hydrophilic lignocellulosic biomass (A'). Hydrophilic lignocellulosic biomass (A') is preferably obtained by hydrophilically treating lignocellulosic biomass (A), which is described later. Hydrophilic lignocellulosic biomass (A') preferably has a contact angle with water of 90° or less, more preferably 80° or less, and further preferably 75° or less.

Hereinafter, the term "lignocellulosic biomass (A)" includes "hydrophilic lignocellulosic biomass (A')".

Lignocellulosic biomass (A) is preferably in the form of particles. The particles may be in any form that can be easily formed from natural biomass, such as a powder and pellets.

Lignocellulosic biomass (A) has an average particle size of preferably 1,000 μm or less, more preferably 500 μm or less, further preferably 300 μm or less, and furthermore preferably 200 μm or less, and preferably 0.1 μm or more, more preferably 1 μm or more, and further preferably 10 μm or more. The average particle size of lignocellulosic biomass (A) is measured using a laser diffraction/scattering particle size distribution analyzer "LA-950" (manufactured by Horiba, Ltd.).

[Base (B)]

Base (B) is at least one base selected from the following (B1) to (B3). As base (B), two or more can be used. In addition, as base (B), two or more bases of different groups selected from (B1) to (B3) may be used in combination. This is the same also for the specific examples of each of the bases given as examples below.

(B1) A resin acid.

(B2) A compound represented by formula (1),

R$^1$—Z$^1$—Z$^2$                                                                         (1)

[wherein

R$^1$ represents a hydrocarbon group with 9 or more carbons,

Z$^1$ represents a single bond or (OR$^2$)$_p$,

R$^2$ represents an alkanediyl group with 2 or more and 3 or less carbons, p represents a number that is on average more than 0 and 30 or less, Z$^2$ represents a group selected from a carboxy group, a hydroxyl group, a sulfate group, and NR$^3$R$^4$, R$^3$ and R$^4$ each independently represent a hydrogen atom, a methyl group, an ethyl group, or (R$^5$O)$_q$H, R$^5$ represents an alkanediyl group with 2 or more and 3 or less carbons, and q represents a number that is on average more than 0 and 15 or less].

(B3) A polyhydric alcohol or a polycarboxylic acid having a molecular weight of 30,000 or less.

Base (B) is considered to be a component that contributes to improving the rain resistance of the soil complex by partially hydrophobizing the surface of lignocellulosic biomass (A) to modify the surface layer of the soil complex.

[Base (B1)]

Base (B1) can be obtained as a component derived from a natural resin. Known natural resins include rosin, lacquer, dammar resin, copal resin, amber, acacia resin, shellac, and gelatin. Two or more of base (B1) can be used.

Base (B1) may be a salt. Examples of the salt include an alkali metal salt, an alkaline earth metal salt, and an ammonium salt.

As base (B1), the following base (B1-1) is preferable.

Base (B1-1): A resin acid selected from rosin, dammar resin, and tall oil fatty acids, or a salt thereof.

Known rosins include, for example, tall rosin obtained from tall oil obtained as a by-product in the pulp producing process, gum rosin obtained from raw pine tar, and wood rosin obtained from pine stumps. Any of these may be used in the present invention. Further, a purified product of a modified rosin such as disproportionated rosin and hydrogenated rosin may also be used. When adding the rosin, the rosin may be in a form in which it is dissolved in a basic solution or an organic solvent.

Dammar resin (also referred to as dammar gum, damar, dammar, damar resin, etc.) is obtained by diluting and dissolving a sap collected from an evergreen tree of Dipterocarpaceae growing in Southeast Asia with an organic solvent. Dammar resin generally contains dammaric acid, α-dammalorecene, β-dammalocene and the like as main components.

Since tall oil fatty acid is obtained from waste liquid during pulp production, the waste can be used effectively. Tall oil fatty acid can be obtained, for example, from pine grown in cold regions such as Northern Europe and North America. Tall oil fatty acid can be obtained by distilling and fractionating crude tall oil. Examples of the distillation include steam distillation. The steam distillation allows the crude tall oil to be fractionated into tall oil fatty acid, resin acid, pitch and the like. Examples of commercially available tall oil fatty acids include Hartall FA-1 (trade name), Hartall FA-1P (trade name), Hartall FA-3 (trade name), Hartall R-30 (trade name), and Hartall SR-30 (trade name), all manufactured by Harima Chemicals Group Inc.

From the viewpoint of maintaining the aggregate structure of the soil and improving the yield of the plant, base (B1) preferably has an acid value of 25 mg/g or more. Here, the acid value of base (B1) is measured by an oxidation degree measurement method (AV) method. The acid value of base (B1) is more preferably 30 mg/g or more and further preferably 100 mg/g or more, and preferably 300 mg/g or less.

[Base (B2)]

Base (B2) is a compound represented by the above general formula (1). Two or more of base (B2) can be used. If possible, base (B2) may be a salt. Examples of the salt include an alkali metal salt, an alkaline earth metal salt, and an ammonium salt.

Examples of base (B2) include fatty acids having 10 or more carbons or a salt thereof, alcohols having a hydrocarbon group with 9 or more carbons, sulfates having a hydrocarbon group with 9 or more carbons or a salt thereof, and amines having a hydrocarbon group with 9 or more carbons. These compounds may contain $(OR^2)$.

In general formula (1), examples of $R^1$ include a chain hydrocarbon group with 9 or more carbons, for example, a linear or branched alkyl group, a linear or branched alkenyl group, a linear alkyl group, and a linear alkenyl group. $R^1$ preferably has 30 or less carbons. $R^2$ is preferably an alkanediyl group with 2 carbons. p represents a number that is on average more than 0 and 30 or less. q represents a number that is on average more than 0 and 15 or less.

Among bases (B), a compound in which $Z^1$ in formula (1) is a single bond and $Z^2$ is a carboxy group is a fatty acid with 10 or more carbons. This fatty acid may be a salt. Examples of the fatty acid salt include an alkali metal salt, an alkaline earth metal salt, and an ammonium salt. The fatty acid preferably has 30 or less carbons. This carbon number denotes the number of carbons of the acid type compound excluding the salt moiety. Examples of the fatty acid or a salt thereof include a fatty acid with 10 or more carbons or a salt thereof selected from a saturated fatty acid with 10 or more carbons, an unsaturated fatty acid with 10 or more carbons, and a salt thereof. Examples of the fatty acid with 10 or more carbons or a salt thereof include the following base (B2-1).

Base (B2-1): A fatty acid selected from capric acid, lauric acid, myristic acid, palmitic acid, stearic acid, oleic acid, linoleic acid, behenic acid, and lignoceric acid, or a salt thereof Among bases (B), a compound in which $Z^1$ in formula (1) is a single bond and $Z^2$ is a hydroxyl group is an alcohol having a hydrocarbon group with 9 or more carbons. The hydrocarbon group of the alcohol is preferably an alkyl group or an alkenyl group. The hydrocarbon group of the alcohol preferably has 10 or more and 30 or less carbons. The alcohol is preferably a monohydric alcohol. The alcohol is preferably an alcohol having a hydrocarbon group with 10 or more carbons selected from a monohydric saturated alcohol having a hydrocarbon group with 10 or more carbons and a monohydric unsaturated alcohol having a hydrocarbon group with 10 or more carbons. Examples of alcohols having a hydrocarbon group with 9 or more carbons include the following base (B2-2).

Base (B2-2): An alcohol selected from decyl alcohol, lauryl alcohol, myristyl alcohol, palmityl alcohol, and stearyl alcohol.

Among bases (B), a compound in which $Z^1$ in formula (1) is a single bond and $Z^2$ is a sulfate group is a sulfate having a hydrocarbon group with 9 or more carbons. The sulfate may be a salt. Examples of a salt of the sulfate include an alkali metal salt, an alkaline earth metal salt, and an ammonium salt. The hydrocarbon group of the sulfate is preferably an alkyl group or an alkenyl group. The hydrocarbon group of the sulfate preferably has 10 or more and 30 or less carbons. Examples of the sulfate or a salt thereof include sulfates having an alkyl group with 10 or more and 30 or less carbons or a salt thereof. The following base (B2-3) may be mentioned as the sulfate or a salt thereof having a hydrocarbon group with 10 or more carbons.

Base (B2-3): A sulfate selected from lauryl sulfate, tetradecyl sulfate, and hexadecyl sulfate, or a salt thereof.

Among bases (B), a compound in which $Z^1$ in formula (1) is a single bond, $Z^2$ is $NR^3R^4$, and $R^3$ and $R^4$ are each a hydrogen atom is an amine having a hydrocarbon group with 9 or more carbons. The amine may be a salt (acid salt). The hydrocarbon group of the amine is preferably an alkyl group or an alkenyl group. The hydrocarbon group of the amine preferably has 10 or more and 30 or less carbons. The amine is preferably a primary amine.

Examples of the amine having a hydrocarbon group with 9 or more carbons include the following base (B2-4). Base (B2-4): An amine selected from dodecylamine, tetradecylamine, and stearylamine.

[Base (B3)]

Base (B3) is a polyhydric alcohol or a polycarboxylic acid having a molecular weight of 30,000 or less. A compound having a plurality of both hydroxyl groups and carboxy groups may also be classified as base (B3). A compound having a plurality of hydroxyl groups and/or a plurality of carboxy groups and having a molecular weight of 30,000 or less other than base (B2) may also be classified as base (B3). Two or more of base (B3) can be used. The polyhydric alcohol of base (B3) is preferably a trihydric or higher polyhydric alcohol.

When the polyhydric alcohol having a molecular weight of 30,000 or less is a polymer, the molecular weight is a weight average molecular weight. This weight average molecular weight is measured by GPC (gel chromatography) using pullulan as a standard substance. Examples of the polyhydric alcohol having a molecular weight of 30,000 or less include the following base (B3-1).

Base (B3-1): A polyhydric alcohol selected from glycerin, polyglycerins, and polyvinyl alcohols having a weight average molecular weight of 30,000 or less The polyglycerin has an average degree of condensation of preferably 2 or more and 300 or less.

The polyvinyl alcohol is a polymer obtained by saponifying polyvinyl acetate obtained by a polymerizing vinyl acetate monomer. The polyvinyl alcohol has a saponification degree of preferably 80 mol % or more and 100 mol % or less. Further, the polyvinyl alcohol has a weight average molecular weight of preferably 200 or more and 30,000 or less.

When the polycarboxylic acid having a molecular weight of 30,000 or less is a polymer, the molecular weight is a weight average molecular weight. This weight average molecular weight is measured by GPC (gel chromatography) using pullulan as a standard substance. The polycarboxylic acid may be a salt. Examples of the salt include an alkali metal salt, an alkaline earth metal salt, and an ammonium salt. Examples of the polycarboxylic acid having a molecular weight of 30,000 or less include the following base (B3-2).

Base (B3-2): A polycarboxylic acid selected from polyacrylic acids having a weight average molecular weight of 30,000 or less and carboxymethyl cellulose having a weight average molecular weight of 30,000 or less, or a salt thereof The polyacrylic acid may be an acid type, a sodium substitution type, or a potassium substitution type. Examples of the form of the polyacrylic acid include a powder, spheres, granules, and any of those may be used. The weight average molecular weight of the polyacrylic acid or a salt thereof is preferably 200 or more and 30,000 or less.

The carboxymethylcellulose is a derivative of cellulose, and is obtained by binding a carboxymethyl group to a part of the hydroxy group of a glucopyranose monomer constituting the cellulose backbone. The carboxymethyl cellulose preferably has a substitution degree (etherification degree) of 0.3 or more and 1.0 or less. The weight average molecular weight of carboxymethyl cellulose is preferably 200 or more and 30,000 or less.

From the viewpoint of improving the yield of plants by maintaining the aggregate structure of the soil, base (B3) preferably has a hydroxyl value of 100 mg/g or more and 2,000 mg/g or less. Here, the hydroxyl value of base (B3) is measured by potentiometric titration. The acid value of base (B3) is more preferably 200 mg/g or more, and more preferably 1600 mg/g or less.

From the viewpoint of improving the yield of plants by maintaining the aggregate structure of the soil, base (B3) preferably has an acid value of 100 mg/g or more and 2,000 mg/g or less. Here, the acid value of base (B3) is measured by a direct titration method (AV) method. The acid value of base (B3) is more preferably 200 mg/g or more, and more preferably 1000 mg/g or less.

From the viewpoint of promoting plant growth, base (B) is preferably at least one base selected from the following base (B1-1), base (B2-1) to base (B2-4), base (B3-1), and base (B3-2).

Base (B1-1): A resin acid selected from rosin, dammar resin, and tall oil fatty acids, or a salt thereof.

Base (B2-1): A fatty acid selected from capric acid, lauric acid, myristic acid, palmitic acid, stearic acid, oleic acid, linoleic acid, behenic acid, and lignoceric acid, or a salt thereof.

Base (B2-2): An alcohol selected from decyl alcohol, lauryl alcohol, myristyl alcohol, palmityl alcohol, and stearyl alcohol.

Base (B2-3): A sulfate selected from lauryl sulfate, tetradecyl sulfate, and hexadecyl sulfate, or a salt thereof.

Base (B2-4): An amine selected from dodecylamine, tetradecylamine, and stearylamine.

Base (B3-1): A polyhydric alcohol selected from glycerin, polyglycerins, and polyvinyl alcohols having a weight average molecular weight of 30,000 or less.

Base (B3-2): A polycarboxylic acid selected from polyacrylic acids having a weight average molecular weight of 30,000 or less and carboxymethyl cellulose having a weight average molecular weight of 30,000 or less, or a salt thereof.

From the viewpoint of promoting plant growth, base (B) is preferably at least one base selected from base (B1) and base (B2).

From the same viewpoint, base (B) is more preferably at least one base selected from base (B1-1), base (B2-1), and base (B2-2).

From the same viewpoint, base (B) is further preferably at least one base selected from rosin or a salt thereof, capric acid or a salt thereof, lauric acid or a salt thereof, myristic acid or a salt thereof, palmitic acid or a salt thereof, stearic acid or a salt thereof, oleic acid or a salt thereof, linoleic acid or a salt thereof, behenic acid or a salt thereof, lignoceric acid or a salt thereof, decyl alcohol, lauryl alcohol, myristyl alcohol, palmityl alcohol, and stearyl alcohol.

The plant growth promoter of the present invention contains hydrophilic lignocellulosic biomass (A') and at least one base (B) selected from the above (B1) to (B3), wherein the contact angle with water is 80° or less.

[Composition, Physical Properties, Etc. of Plant Growth Promoter]

The plant growth promoter of the present invention has a contact angle with water (hereinafter also referred to as a water contact angle) of 80° or less. From the viewpoint of soil compatibility and rain resistance, this water contact angle is preferably 80° or less, more preferably 75° or less, and further preferably 70° or less, and preferably 0° or more, more preferably 5° or more, and further preferably 10° or more.

In the present invention, the water contact angle of the plant growth promoter is measured under the following conditions.

[Measurement Method of Water Contact Angle of Plant Growth Promoter]

When the plant growth promoter to be measured is obtained as a solid such as powder, 0.1 to 0.3 g of the plant growth promoter is sampled and pressure is applied so that the density is 1.3 to 1.7 g/cm$^3$ to obtain a compressed product as a sample having a flat surface, for example, a compressed product having a shape such as a cylinder, a cube, or a rectangular parallelepiped. In addition, when the particles of the plant growth promoter to be measured are large or irregular in shape and the like, the particles may be pulverized to obtain a powder having adjusted particle size and shape, and this powder may be used as the sample as a compressed product in the same manner as described above. Further, the powder of the plant growth promoter may be finely pulverized by compression.

The sample, for example, a compressed product of plant growth promoter, is placed so that its flat surface is horizontal. Pure water of 20° C. and with a droplet size of 5 μm is dropped onto the flat surface, and the contact angle after 1 second is measured. The contact angle is calculated by finding the angle of the straight line connecting the left and right end points and the vertex of the droplet to the solid surface and doubling this (θ/2 method). The measurement is performed 3 times per sample, and the value obtained as the average value thereof is adopted as the water contact angle. When the plant growth promoter to be measured is obtained as a liquid, particularly as a liquid composition containing water, the contact angle measured by the above method by using a solid obtained by removing liquid components such as water is adopted.

The water contact angle of the plant growth promoter of the present invention can be set to a desired range by a method in which the ratio between lignocellulosic biomass (A) and base (B) is adjusted by using hydrophilic lignocellulosic biomass (A').

From the viewpoint of soil dispersibility and rain resistance, the plant growth promoter of the present invention contains preferably 0.001 parts by mass or more, more preferably 0.005 parts by mass or more, further preferably 0.01 parts by mass or more, and furthermore preferably 0.1 parts by mass or more, and preferably 100 parts by mass or less, more preferably 50 parts by mass or less, further preferably 20 parts by mass, and furthermore preferably 10 parts by mass or less of base (B) with respect to 100 parts by mass of lignocellulosic biomass (A). In addition, when using a salt of base (B), an amount calculated based on the form of an unneutralized compound (acid type or base type compound) is adopted as the amount of base (B). The same applies to the other matters relating to the amount of base (B).

In the plant growth promoter of the present invention, it is preferable that lignocellulosic biomass (A) and base (B) form a complex. Specifically, the plant growth promoter of the present invention preferably contains a complex of lignocellulosic biomass (A) and base (B). This complex may form a state in which lignocellulosic biomass (A) and base (B) are integrated by chemical and/or physical bonding. Examples of such a complex include a complex in which base (B) is bonded to the surface of lignocellulosic biomass (A). Further, examples of such a complex include particles containing lignocellulosic biomass (A) and base (B), a complex in which base (B) is present on the surface of lignocellulosic biomass (A).

The plant growth promoter of the present invention contains preferably 20% by mass or more and more preferably 40% by mass or more, and preferably 100% by mass or less of lignocellulosic biomass (A) and base (B) in total. The plant growth promoter of the present invention may be composed of lignocellulosic biomass (A) and base (B). Further, the plant growth promoter of the present invention may be composed of a complex of lignocellulosic biomass (A) and base (B). In addition, the plant growth promoter of the present invention can contain an optional component other than lignocellulosic biomass (A) and base (B).

The plant growth promoter can contain, as optional components, for example:

(1) a fertilizer component;

(2) a mineral powder, a clay component, or other soil-improving component such as zeolite, vermiculite, bentonite, soft silica (silicate terra alba), perlite, peat moss, or bark compost;

(3) a polymer substance such as polyethyleneimine, polyvinyl alcohol, or polyacrylic acid (excluding base (B-3));

(4) a signal molecule such as chitooligosaccharide, a chitinous compound, or flavonoid such as isoflavone or rutin;

(5) a fungus such as an arbuscular mycorrhizal fungus;

(6) a bacterium such as *Bacillus* sp., *Pseudomonas* sp., *Azospirillum* sp., *Paenibacillus* sp., *Burkholderia* sp., *Serratia* sp., *Enterobacter* sp., *Brevibacterium* sp., *Curtobacterium* sp., or a legume symbiotic root nodule bacterium; and (7) soyasaponin.

Among the above components, examples of the arbuscular mycorrhizal fungus of (5) include fungi belonging to the *Gigaspora* sp. and the *Glomus* sp. Among these, examples of *Glomus* sp. include *Glomus intraradices*.

Among the above components, examples of the *Bacillus* sp. of (6) include *Bacillus amyloliquefaciens*, *Bacillus licheniformis*, *Bacillus subtilis*, and *Bacillus thuringiensis*. Examples of *Pseudomonas* sp. include *Pseudomonas putida*, and *Pseudomonas fluorescens*. Examples of *Azospirillum* sp. include *Azospirillum brasilense*, *Azospirillum lipoferum*, *Azospirillum halopraeferans*, and *Azospirillum amazonense*. Examples of *Paenibacillus* sp. include *Paenibacillus polymyxa* and *Paenibacillus macerans*. Examples of *Burkholderia* sp. include *Burkholderia gladioli*. Examples of *Serratia* sp. include *Serratia marcescens*. Examples of *Enterobacter* sp. include *Enterobacter cloacae*. Examples of *Brevibacterium* sp. include *Brevibacterium iodinum* and *Brevibacterium brevis*. Examples of *Curtobacterium* sp. include *Curtobacterium flaccumfaciens*. Examples of the legume symbiotic root nodule bacterium include bacteria belonging to the *Rhizobium* genus, the *Bradyrhizobium* genus, and *Azorhizobium* genus. Examples of *Bradyrhizobium* sp. include *Bradyrhizobium diazoefficiens*, *Bradyrhizobium japonicum*, *Bradyrhizobium elkanii*, and *Ensifer fredii*.

Among the above components, examples of (7) soyasaponin include the examples described in paragraph of WO-A 2018/159393.

The plant growth promoter of the present invention can contain 1% by mass or more and 50% by mass or less of (1) a fertilizer component.

The plant growth promoter of the present invention can contain 1% by mass or more and 50% by mass or less of (2) a mineral powder, a clay component, or other soil-improving component; or (3) a polymer substance, respectively.

The plant growth promoter of the present invention can contain $2.5 \times 10^{-13}$% by mass or more and $2.5 \times 10^{-11}$% by mass or less of (4) a signal molecule.

The plant growth promoter of the present invention can contain $10^2$ cfu (colony forming units) or more and $10^7$ cfu or less of (5) a fungus and/or (6) a bacterium per 1 g of the total of lignocellulosic biomass (A) and base (B), respectively. Here, in the case of a fungus, the colony forming unit means the number of spores.

The plant growth promoter of the present invention can contain (7) soyasaponin so as to be used in the amount described in paragraph [0040] of WO-A 2018/159393, for example.

It is expected that the activity and the amount of adhesion of useful microorganisms, for example, plant growth-promoting bacteria such as an arbuscular mycorrhizal fungus, *Bacillus* sp., *Pseudomonas* sp., *Azospirillum* sp., *Paenibacillus* sp., *Burkholderia* sp., *Serratia* sp., *Enterobacter* sp., *Brevibacterium* sp., and *Curtobacterium* sp.; and legume symbiotic root nodule bacteria, that exist in the soil will be able to be improved by adding the plant growth promoter of the present invention to soil. It is expected similarly that the activity and the amount of adhesion of plant growth-promoting bacteria such as an arbuscular mycorrhizal fungus, *Bacillus* sp., *Pseudomonas* sp., *Azospirillum* sp., *Paenibacillus* sp., *Burkholderia* sp., *Serratia* sp., *Enterobacter* sp., *Brevibacterium* sp., and *Curtobacterium* sp.; or legume symbiotic root nodule bacteria that the plant growth promoter of the present invention contains will be able to be improved.

From the viewpoint of attachment of lignocellulosic biomass (A) and base (B) to the action site and the viewpoint of an increase in the permeation amount, the plant growth promoter of the present invention can contain a surfactant. Examples of the surfactant include one or more surfactants selected from nonionic surfactants, anionic surfactants, cationic surfactants, and amphoteric surfactants. As the surfactant, a nonionic surfactant is preferable.

When the plant growth promoter of the present invention contains a surfactant (excluding a surfactant corresponding to base (B)), the content of the surfactant (excluding a surfactant corresponding to base (B)) is, with respect to a total of 100 parts by mass of lignocellulosic biomass (A) and base (B), preferably 0.01 parts by mass or more, more preferably 0.1 parts by mass or more, and further preferably 1 part by mass or more, and preferably 100 parts by mass or less, more preferably 80 parts by mass or less, and further preferably 50 parts by mass or less. In addition, when the surfactant corresponds to base (B), the content of the surfactant is included in the content of base (B). Similarly, for components other than the surfactant, the contents of the components corresponding to base (B) are all included in the content of base (B).

From the viewpoint of increasing the amount of lignocellulosic biomass (A) and base (B) attached to the action site, the plant growth promoter of the present invention can contain a water-soluble polymer. Herein, the term "water soluble" in regard to the water-soluble polymer refers to dissolving 1 g or more in 100 g of water at 20° C. Any of natural, semisynthetic, and synthetic polymers can be used as the water-soluble polymer. Among them, a water-soluble polysaccharide polymer is preferable. Specific examples of the water-soluble polysaccharide polymer include guar gum, xanthan gum, starch, cellulose, tara gum, locust bean gum, carrageenan, and their derivatives. When the plant growth promoter of the present invention contains a water-soluble polymer (excluding the compound corresponding to base (B)), the water-soluble polymer is contained in an amount of preferably 1 part by mass or more, more preferably 10 parts by mass or more, and further preferably 50 parts by mass or more, and preferably 1,900 parts by mass or less, more preferably 600 parts by mass or less, and further preferably 300 parts by mass or less, with respect to a total of 100 parts by mass of lignocellulosic biomass (A) and base (B).

The plant growth promoter of the present invention can contain, for example, a fertilizer component in addition to these. Specifically, a fertilizer component available under a trade name such as HYPONICA (Kyowa Co., Ltd.) or HYPONEX can be contained in an amount of 1 part by mass or more and 1,900 parts by mass or less with respect to a total of 100 parts by mass of lignocellulosic biomass (A) and base (B).

The form of the plant growth promoter of the present invention is preferably a solid, and more preferably a particulate. The plant growth promoter of the present invention can contain a solid, or further, particles including lignocellulosic biomass (A) and base (B). The particles may be in any form that can be easily formed from a mixture including lignocellulosic biomass (A) and base (B), such as a powder and pellets. Further, the plant growth promoter of the present invention may also be in the form of a molded material of a mixture including lignocellulosic biomass (A) and base (B), for example, a molded material of a complex including lignocellulosic biomass (A) and base (B), or a complex product of lignocellulosic biomass (A) and/or base (B) with another article. The plant growth promoter of the present invention has an average particle size of preferably 1,000 µm or less, more preferably 500 µm or less, further preferably 300 µm or less, and furthermore preferably 200 µm or less, and preferably 0.1 µm or more, more preferably 1 µm or more, and further preferably 10 µm or more. The average particle size of the plant growth promoter of the present invention is measured using a laser diffraction/scattering particle size distribution analyzer "LA-950" (manufactured by Horiba, Ltd.).

The plant growth promoter of the present invention is preferably used by adding it to soil. Specifically, the plant growth promoter of the present invention is preferably a soil addition type plant growth promoter. Application of the plant growth promoter of the present invention to a plant, for example, an agricultural crop, can be carried out in soil containing the plant growth promoter of the present invention to cultivate the plant, for example, the agricultural crop.

The plant to which the present invention can be applied is preferably a plant used as an agricultural crop. The plant growth promoter of the present invention can be used as a plant yield enhancer, and further as a crop yield enhancer. Examples of the plants to which the plant growth promoter of the present invention can be applied include Cucurbitaceae, Solanaceae, Rosaceae, Malvaceae, Leguminosae, Gramineae, Brassicaceae, Alliaceae, Amaryllidaceae, Compositae, Amaranthaceae, Umbelliferae, Zingiberaceae, Lamiaceae, Araceae, Convolvulaceae, Dioscoreaceae, and Nelumbonaceae. Specifically, examples of fruit and vegetables include cucumbers, pumpkins, watermelons, melons, tomatoes, eggplants, bell peppers, strawberries, okra, green beans, broad beans, peas, green soybeans, and corn. Examples of leaf vegetables include Chinese cabbages, pickled greens, Ching Guang Juai, cabbages, cauliflowers, broccolis, brussels sprouts, onions, welsh onions, garlics, rakkyos, Chinese chives, asparaguses, lettuces, butter lettuces, celeries, spinaches, garland chrysanthemums, parsleys, mitsubas, cicelies, udo salad plants, myoga gingers, sweet coltsfoot, and Japanese basils. Examples of root vegetables include daikon radishes, turnips, burdocks, carrots, potatoes, eddoes, sweet potatoes, yams, gingers, and lotuses. In addition, the plant growth promoter of the present invention may be used for rice, wheat varieties, flowers, and the like, and is more preferably applied to cereals such as beans such as soybeans and green soybeans, which tend to be cultivated on a large scale.

<Method for Producing Plant Growth Promoter>

The present invention provides a method for producing a plant growth promoter, including the following step 1 and step 2:

Step 1: a step of hydrophilically treating lignocellulosic biomass (A) to obtain hydrophilic lignocellulosic biomass (A'); and Step 2: obtaining a mixture containing hydrophilic lignocellulosic biomass (A') obtained in step 1 and at least one base (B) selected from the following (B1) to (B3) and having a contact angle with water of 80°, <Base (B)>

(B1) a resin acid, (B2) a compound represented by formula (1), $$R^1-Z^1-Z^2 \qquad (1)$$

[wherein $R^1$ represents a hydrocarbon group with 9 or more carbons, $Z^1$ represents a single bond or $(OR^2)_p$, $R^2$ represents an alkanediyl group with 2 or more and 3 or less carbons, p represents a number that is on average more than 0 and 30 or less, $Z^2$ represents a group selected from a carboxy group, a hydroxyl group, a sulfate group, and $NR^3R^4$, $R^3$ and $R^4$ each independently represent a hydrogen atom, a methyl group, an ethyl group, or $(R^5O)_qH$, $R^5$ represents an alkanediyl group with 2 or more and 3 or less carbons, and q represents a number that is on average more than 0 and 15 or less], and (B3) a polyhydric alcohol or a polycarboxylic acid having a molecular weight of 30,000 or less.

Hydrophilic lignocellulosic biomass (A') obtained in step 1 preferably has a contact angle with water of 90° or less, more preferably 80° or less, and further preferably 75° or less. It is preferable to hydrophilize lignocellulosic biomass (A) so as to achieve this contact angle. The contact angle of hydrophilic lignocellulosic biomass (A') can be measured in the same manner as the plant growth promoter of the present invention.

Specific examples and preferred embodiments of base (B) are the same as those of the plant growth promoter of the present invention.

The hydrophilic treatment of step 1 is preferably an alkali treatment, a hot water treatment, an acid treatment, or a combination of these, more preferably an alkali treatment, a hot water treatment, or a combination of these, and further preferably a combination of an alkali treatment and a hot water treatment (hereinafter also referred to as "alkali hot water treatment"). The hydrophilic treatment may include a neutralization treatment, a drying treatment, and the like as necessary.

The hydrophilic treatment of step 1 is preferably performed in a medium including water.

The alkali treatment is now described.

The alkali treatment is carried out by contacting the alkaline medium with lignocellulosic biomass (A) at a predetermined temperature for a predetermined time. The alkaline medium preferably includes water. Specific examples include an aqueous sodium hydroxide solution, an aqueous potassium hydroxide solution, an aqueous lithium hydroxide solution, an aqueous calcium hydroxide solution, an aqueous magnesium hydroxide solution, an aqueous sodium carbonate solution, an aqueous potassium carbonate solution, aqueous ammonia, and an aqueous tetramethylammonium hydroxide solution. The pH of the alkaline medium is preferably 10 or more and 14 or less. The temperature of the alkaline medium is preferably 25° C. or higher and 50° C. or lower. The contact time of the alkaline medium is preferably 0.1 hour or more and 7 days or less.

The following method is an example of the alkali treatment.

A slurry is produced by mixing 100 parts by mass of lignocellulosic biomass (A) and 200 parts by mass or more and 2,000 parts by mass or less of an alkaline medium having an arbitrary concentration, preferably an alkaline medium selected from an aqueous sodium hydroxide solution, an aqueous potassium hydroxide solution, an aqueous lithium hydroxide solution, an aqueous calcium hydroxide solution, an aqueous magnesium hydroxide solution, an aqueous sodium carbonate solution, an aqueous potassium carbonate solution, aqueous ammonia, and an aqueous tetramethylammonium hydroxide solution. The alkali treatment is carried out by leaving the slurry to stand or with stirring at 25° C. or higher and 50° C. or lower, for example, at room temperature, for 1 hour or more and 1 week or less.

It is preferable to perform neutralization after the alkali treatment. The neutralization is performed by adding a neutralizing agent, for example, hydrochloric acid or sulfuric acid having an arbitrary concentration, so that the post-treatment pH of the slurry including lignocellulosic biomass (A) is 6 to 7. Drying can also be performed after the alkali treatment, and preferably after neutralization.

The hot water treatment is now described.

The hot water treatment is carried out by contacting hot water with lignocellulosic biomass (A) for a certain period of time. The temperature of the hot water is preferably 80° C. or higher and 200° C. or lower. The contact time of hot water is preferably 0.1 hours or more and 24 hours or less.

The following method is an example of the hot water treatment.

A slurry is produced by mixing 100 parts by mass of lignocellulosic biomass (A) and 200 parts by mass or more and 2,000 parts by mass or less of hot water, for example, heated ion exchange water. For example, the treatment temperature can be selected from 120° C. to 200° C., and the treatment time can be selected from 1 hour to 24 hours. The hot water treatment is carried out by leaving the slurry to stand or with stirring under such conditions. Drying can also be performed after the hot water treatment.

The acid treatment is now described.

The acid treatment is carried out by contacting an acidic medium with lignocellulosic biomass (A) at a predetermined temperature for a predetermined time. The acidic medium preferably includes water. Specific examples include aqueous solutions of hydrochloric acid, sulfuric acid, nitric acid, phosphoric acid, acetic acid, peracetic acid, sulfurous acid, nitrous acid, oxalic acid, carbonic acid, boric acid, hypochlorous acid, and the like. The pH of the acidic medium is preferably 1 or more and 5 or less. The temperature of the acidic medium is preferably 25° C. or higher and 200° C. or lower. The contact time of the acidic medium is preferably 0.1 hours or more and 7 days or less.

The following method is an example of the acid treatment.

A slurry is produced by mixing 100 parts by mass of lignocellulosic biomass (A) and 200 parts by mass or more and 2,000 parts by mass or less of an acidic medium having an arbitrary concentration, preferably an acidic medium selected from an acidic medium including water and an acid selected from hydrochloric acid, sulfuric acid, nitric acid, phosphoric acid, acetic acid, peracetic acid, sulfurous acid, nitrous acid, oxalic acid, carbonic acid, boric acid, and hypochlorous acid. For example, the treatment temperature can be selected from 80° C. to 200° C., and the treatment time can be selected from 1 hour to 24 hours. The acid treatment is carried out by leaving the slurry to stand or with stirring under such conditions.

It is preferable to perform neutralization after the acid treatment. The neutralization is carried out by adding a neutralizing agent, for example, an aqueous sodium hydroxide solution having an arbitrary concentration, so that the pH of the slurry containing lignocellulosic biomass (A) after treatment is 6 to 7. Drying can also be performed after the acid treatment, and preferably after the neutralization.

The alkali hot water treatment is now described.

The alkali hot water treatment is carried out by performing the above alkali treatment in a high-temperature alkaline medium including water. Specific examples of the alkaline medium are the same as those in the alkali treatment. The pH of the alkaline medium used in the alkali hot water treatment is preferably 9.0 or higher and more preferably 10.0 or higher, and preferably 14.0 or lower and more preferably 13.5 or lower. The temperature of the alkaline medium used in the alkali hot water treatment is preferably 25° C. or higher and more preferably 50° C. or higher, and preferably 180° C. or lower and more preferably 150° C. or lower. The contact time of the alkaline medium used in the alkali hot water treatment is preferably 0.5 hours or longer and more preferably 0.8 hours or longer, and preferably 24 hours or shorter and more preferably 12 hours or shorter.

The following method is an example of the alkali hot water treatment.

A slurry is produced by mixing 100 parts by mass of lignocellulosic biomass (A) and 200 parts by mass or more and 2,000 parts by mass or less of an alkaline medium having an arbitrary concentration, preferably an alkaline medium selected from an aqueous sodium hydroxide solution, an aqueous potassium hydroxide solution, an aqueous lithium hydroxide solution, an aqueous calcium hydroxide solution, an aqueous magnesium hydroxide solution, an aqueous sodium carbonate solution, an aqueous potassium carbonate solution, aqueous ammonia, and an aqueous tetramethylammonium hydroxide solution. For example, the treatment temperature can be selected from 25° C. to 180° C., and the treatment time can be selected from 0.5 hours to 24 hours. The alkali hot water treatment is carried out by leaving the slurry to stand or with stirring under such conditions.

After the alkali hot water treatment, it is preferable to perform the same kind of neutralization as in the alkali treatment. Drying can also be performed after the alkali hot water treatment, and preferably after the neutralization.

In step 1, it is preferable to obtain a slurry containing hydrophilic lignocellulosic biomass (A') and water.

In step 2, a mixture containing hydrophilic lignocellulosic biomass (A') and base (B) obtained in step 1 and having a contact angle with water of 80° or less is obtained. The mixture is obtained by mixing hydrophilic lignocellulosic biomass (A') and base (B). The ratio between hydrophilic lignocellulosic biomass (A') and base (B) is adjusted so that the contact angle with water is 80° or less. In step 2, the amount of base (B) mixed is, with respect to 100 parts by mass of lignocellulosic biomass (A'), preferably 0.005 parts by mass or more, more preferably 0.01 parts by mass or more, and further preferably 0.1 parts by mass, and preferably 100 parts by weight or less, more preferably 50 parts by weight or less, and further preferably 20 parts by weight or less.

In the present invention, it is preferable, in step 1, to obtain the slurry containing hydrophilic lignocellulosic biomass (A') and water, and in step 2, to obtain the mixture by adding base (B) to the slurry and then drying the slurry. This method can easily produce a complex of hydrophilic lignocellulosic biomass (A') and base (B), for example, a complex in which base (B) is bonded to the surface of hydrophilic lignocellulosic biomass (A').

Further, in this method, it is preferable to add alkaline medium containing base (B) and water or a neutral medium containing base (B) and a solvent to the slurry. Examples of the solvent include one or more solvents selected from water, methanol, ethanol, propanol, dimethylformamide (DMF), acetone, dichloromethane, chloroform, and tetrahydrofuran (THF). The solvent is selected in consideration of the solubility of base (B).

In step 2, in the case of using the slurry, it is preferable to perform the neutralization after base (B) is added. The neutralization is carried out by adding a neutralizing agent, such as hydrochloric acid or sulfuric acid or aqueous sodium hydroxide solution having an arbitrary concentration, so that the pH of the slurry including lignocellulosic biomass (A) and base (B) after the treatment is 6 to 7.

In addition, in step 2, in the case of using the slurry, it is preferable to perform drying after adding base (B), preferably after neutralization. The drying can be performed, for example, in a vacuum dryer at a predetermined temperature, for example, 50° C., until the water content is 5 parts by mass or less.

The mixture obtained in step 2 containing hydrophilic lignocellulosic biomass (A') and base (B) and having a contact angle with water of 80° or less is used by processing it into an appropriate shape and size to produce the plant growth promoter of the present invention.

<Method for Growing a Plant>

The present invention provides a method for growing a plant, wherein the plant is cultivated in a soil containing the plant growth promoter of the present invention. The preferred embodiments of lignocellulosic biomass (A) and base (B) used in the method for growing a plant of the present invention are the same as those of the plant growth promoter of the present invention.

Plants to which the method for growing a plant of the present invention can be applied are the same as those of the plant growth promoter of the present invention. Further, it is preferable that the method for growing a plant of the present invention is a method for growing an agricultural crop or a method for cultivating an agricultural crop.

In the method for growing a plant of the present invention, the application time and the number of applications of the plant growth promoter of the present invention are not particularly limited. The plant growth promoter of the present invention may also be applied by adding to the soil and the like before sowing. The plant growth promoter of the present invention may be appropriately applied in accordance with the level of plant growth in any period from the start of cultivation, such as sowing and planting, to the end of cultivation, such as harvesting.

Further, in the method for growing a plant of the present invention, the plant growth promoter of the present invention is applied to the plant by adding it to the soil in which the plant is to be cultivated. The timing for adding to the soil is preferably before sowing.

In the present invention, the addition of the plant growth promoter of the present invention to the soil can be carried out by mixing the plant growth promoter of the present invention into the soil, spraying the plant growth promoter of the present invention onto the soil, and the like.

Examples of the specific method of adding the plant growth promoter of the present invention to the soil in a field include a method of plowing while spraying the plant growth promoter of the present invention by using a spreading machine in combination with a cultivator.

In the present invention, the plant growth promoter of the present invention is added, further, in total of lignocellulosic biomass (A) and base (B), in an amount of preferably 0.0001 parts by mass or more, more preferably 0.01 parts by mass or more, and further preferably 0.05 parts by mass or more, and preferably 10 parts by mass or less, more preferably 5 parts by mass or less, further preferably 2.5 parts by mass or less, furthermore preferably 2.0 parts by mass or less, furthermore preferably 1.0 parts by mass or less, and furthermore preferably 0.5 parts by mass or less per 100 parts by mass of the soil for cultivating the plant. In other words, in the present invention, the plant is cultivated in a soil containing the plant growth promoter of the present invention, further, in total of lignocellulosic biomass (A) and base (B), in an amount of preferably 0.0001 parts by mass or more, more preferably 0.01 parts by mass or more, and further preferably 0.05 parts by mass or more, and preferably 10 parts by mass or less, more preferably 5 parts by mass or less, further preferably 2.5 parts by mass or less, furthermore preferably 2.0 parts by mass or less, furthermore preferably 1.0 parts by mass or less, and furthermore preferably 0.5 parts by mass or less.

When the plant growth promoter of the present invention is added using the plant growth method of the present invention to the soil by, for example, spraying, the plant growth promoter of the present invention is added, further, in total of lignocellulosic biomass (A) and base (B), in an amount of preferably 0.2 kg or more, more preferably 2 kg or more, and further preferably 20 kg or more, and preferably 20,000 kg or less, more preferably 5,000 kg or less, further preferably 2,000 kg or less, furthermore preferably 1,000 kg or less, and furthermore preferably 500 kg or less per 10a of soil. Even when spraying the plant growth promoter of the present invention, further, PKS, the amount added per 100 parts by mass of soil may be within the above range.

OTHER MODES OF PRESENT INVENTION

The present invention relates to a soil aggregating agent containing lignocellulosic biomass (A) and at least one base (B) selected from the above (B1) to (B3), wherein the contact angle with water is 80° or less.

Further, the present invention relates to a soil aggregating method including mixing a soil aggregating agent containing lignocellulosic biomass (A) and at least one base (B) selected from the above (B1) to (B3), wherein the contact angle with water is 80° or less, with soil.

In addition, the present invention relates to a method for producing a soil granulated material, the method including mixing a soil aggregating agent containing lignocellulosic biomass (A) and at least one base (B) selected from the above (B1) to (B3), wherein the contact angle with water is 80° or less, with soil.

In the soil aggregating agent, the soil aggregating method, and the method for producing a soil granulated material of the present invention, specific examples and preferred embodiments of lignocellulosic biomass (A) and base (B) are the same as those of the plant growth promoter, the method for producing a plant growth promoter, and the method for growing a plant of the present invention. Further, the matters described for the plant growth promoter, the method for producing a plant growth promoter, and the method for growing a plant of the present invention can be applied to the soil aggregating agent, the soil aggregating method, and the method for producing a soil granulated material of the present invention.

The present invention relates to a use, as a plant growth promoter, of a mixture containing lignocellulosic biomass (A) and at least one base (B) selected from (B1) to (B3), wherein the contact angle with water is 80° or less.

Further, the present invention relates to a use, for promoting plant growth, of a mixture containing lignocellulosic biomass (A) and at least one base (B) selected from the above (B1) to (B3), wherein the contact angle with water is 80° or less.

In addition, the present invention relates to a use, as a soil aggregating agent, of a mixture containing lignocellulosic biomass (A) and at least one base (B) selected from the above (B1) to (B3), wherein the contact angle with water is 80° or less.

Furthermore, the present invention relates to a use, for aggregating soil, of a mixture containing lignocellulosic biomass (A) and at least one base (B) selected from the above (B1) to (B3), wherein the contact angle with water is 80° or less.

In these uses of the present invention, specific examples and preferred embodiments of lignocellulosic biomass (A) and base (B) are the same as those of the plant growth promoter, the method for producing a plant growth promoter, and the method for growing a plant of the present invention. Further, the matters described for the plant growth promoter, the method for producing a plant growth promoter, and the method for growing a plant of the present invention can be applied to these uses of the present invention.

EXAMPLES

The plant growth promoter of the inventive product was produced as follows.

Production Example 1

Inventive products 1 and 2 of the plant growth promoter were produced by the following steps 1 and 2.

(Step 1)

As lignocellulosic biomass (A), sugarcane bagasse (written as "bagasse" in the table) passed through a 1 mm diameter mold sieve in an amount of 30 g as a dry mass was placed in a glass bottle, and a 1.6% by mass aqueous sodium hydroxide solution was added so that the solid content was 20% by mass. The glass bottle was heated in an autoclave at 100° C. for 1 hour to obtain a slurry as a reaction product. In step 1 of this example, the amount of the 1.6% by mass aqueous sodium hydroxide solution added was 400 parts by mass, and the amount of NaOH added was 6.4 parts by mass with respect to 100 parts by mass of sugarcane bagasse as lignocellulosic biomass (A).

(Step 2)

An aqueous sodium hydroxide solution (rosin concentration: 1.0% by mass, pH 9) obtained by dissolving rosin as base (B) in the slurry obtained in step 1 was added such that the amount of rosin added was 0.1 mass part with respect to 100 parts by mass parts of sugarcane bagasse, and stirred. After stirring, neutralization was performed using 1 M aqueous sulfuric acid until the pH reached 7, and the resulting slurry-like substance was thermally dried at 80° C. to obtain inventive product 1 of the plant growth promoter. The rosin used was a powdery part manufactured by Wako Pure Chemical Industries, Ltd., and the acid value was 167 mg/g.

Further, an inventive product 2 was obtained in the same manner by changing the amount of the rosin added to 1.0 part by mass with respect to 100 parts by mass of sugarcane bagasse as lignocellulosic biomass (A).

In the above method, a plant growth promoter is obtained in which rosin as base (B) is present on the surface of sugarcane bagasse as lignocellulosic biomass (A).

Production Example 2

Inventive products 3 to 6 of the plant growth promoter were produced in the same manner as in Production Example 1, except that the conditions in step 1 and the amount of rosin added as base (B) were changed as shown in Table 1.

Production Example 3

Inventive product 7 of the plant growth promoter was produced in the same manner as in Production Example 1, except that lignocellulosic biomass (A) was changed to rice straw.

Production Example 4

Inventive products 8 to 18 of the plant growth promoter were produced in the same manner as in Production Example 1, except that base (B) was changed as shown in Table 1. Further, as required, the solvent in which base (B) was dissolved in step 2 was changed to only water.

In addition, comparative products 1 and 2 of the plant growth promoter are as follows.
Comparative product 1: Calcium lignin sulfonate, Ligno Super D, manufactured by Kono New Material Development Co., Ltd., main component of calcium lignin sulfonate
Comparative product 2: Rosin, manufactured by Wako Pure Chemical Industries, Ltd., acid value of 167 mg/g, powdered portion used
Comparative products 3 to 10 of the plant growth promoter were obtained in the following Comparative Production Examples 1 to 6.

Comparative Production Example 1

The slurry obtained in step 1 of Production Example 1 was neutralized using 1 M aqueous sulfuric acid until reaching a pH of 7, and then thermally dried at 80° C. to obtain a comparative product 3 of the plant growth promoter. The comparative product 3 corresponds to a product not containing base (B) in inventive product 1.

Comparative Production Example 2

An aqueous sodium hydroxide solution (rosin concentration 1.0 mass %, pH 9) in which rosin had been dissolved as base (B) was added to sugarcane bagasse that had been passed through a 1 mm diameter mold sieve such that the amount of rosin added was 0.1 parts by mass with respect to 100 parts by mass of the sugarcane bagasse, and stirring was carried out at 30° C. for 120 minutes. After the stirring, neutralization was performed using 1 M aqueous sulfuric acid until the pH reached 7, and the resulting slurry-like substance was thermally dried at 80° C. to obtain a comparative product 4 of the plant growth promoter.

Comparative Production Example 3

A chloroform solution in which methyl stearate had been dissolved was added to the slurry obtained in step 1 of Production Example 1 such that the amount of the methyl stearate added was 1.0 part by mass with respect to 100 parts by mass of the sugarcane bagasse, and then stirring was carried out. After the stirring, the resulting slurry-like substance was thermally dried at 80° C. to obtain a comparative product 5 of the plant growth promoter.

Comparative Production Example 4

Comparative products 6 and 7 of the plant growth promoter were produced in the same manner as in Production Example 1, except that base (B) was changed to that shown in Table 1 and the solvent of base (B) in step (2) was changed to acetone.

Comparative Production Example 5

Comparative products 8 and 9 of the plant growth promoter were produced in the same manner as in Production Example 1, except that base (B) was changed to that shown in Table 1 and the solvent of base (B) in step (2) was changed to ion exchange water.

The contact angle of the plant growth promoter of the obtained inventive products and comparative products was measured by the above method, and is shown in Table 1. In Table 1, components not corresponding to lignocellulosic biomass (A) or base (B) are also shown in the respective columns for convenience.

EVALUATION (1) Water Resistance Evaluation of Soil Granulated Material
The water resistance of a mixed granulated material obtained by mixing the plant growth promoter shown in Table 1 and soil was evaluated.

As the soil, a sample of soil (alluvial soil) from Saga Prefecture that had been passed through a sieve having 2 mm openings to remove coarse particles, stones, and gravel was used.

The soil was placed in a 100 mL polycup, and the plant growth promoter shown in Table 1 was added so as to have the amount added shown in Table 1 with respect to 100 parts by mass of the soil. Further, water was added so as to be 30% by mass with respect to the soil, and after manually stirring for about 3 minutes, soil granulated material having a diameter of 1 to 3 mm was taken as a sample from the material obtained. The obtained soil granulated sample was placed in a disposable glass test tube (13 mm×100 mm, manufactured by IWAKI) filled with water to a height of 5 cm, and the time until the soil granulated material broke down was measured. Each test was repeated 5 times, and the average value is shown in Table 1. In addition, the amount of the plant growth promoter added in the table is represented as parts by mass with respect to 100 parts by mass of soil (the same applies hereinafter). In the table, sodium lauryl sulfate is shown as the amount of the sodium salt added.

(2) Soybean Growth Test
The growth promotion effect on soybeans when the plant growth promoters shown in Table 2 were added to the soil and applied to soybeans was evaluated.

As the soil, Arakida soil (purchased from Kohnan Shoji Co., Ltd.) that had been passed through a sieve having 2 mm openings to remove coarse particles, stones, and gravel was used.

The soil was placed in an electric mixer (drum capacity 63L, "SS100-63" (Shinsei Co., Ltd.)), and a plant growth promoter shown in Table 2 was added so as to be 0.1 parts by mass with respect to 100 parts by mass of soil. Further, water was added so as to be 20 mass % with respect to the soil, and after stirring for about 5 minutes, the obtained mixture was taken as the soil sample. The soil sample was placed in a polyethylene pot for seedlings (diameter 12 cm), fertilized so that N/P/K=6 kg/6 kg/6 kg per 10 a, and soybeans grown separately until the cotyledon development stage (varieties: Fukuyutaka, IWAKURA SEED Co.) were replanted in the pot. About 3 weeks after the replanting, the soybean seedlings were taken out and washed with water, and the dry mass of the part below the ground was measured. The number of repetitions was 8, and the average value thereof was obtained. Each average value is shown in Table 2 as a relative value based on a control value of 100. The control was performed without using the plant growth promoter (Comparative Example 2-1 in Table 2). A large relative value in Table 2 means that viability until harvest is good, and an increase in crop yield is expected.

(3) Measurement of Soil Hardness
As the soil, Arakida soil (purchased from Kohnan Shoji Co., Ltd.) that had been passed through a sieve having 2 mm openings to remove coarse particles, stones, and gravel was used.

The soil was placed in an electric mixer (drum capacity 63L, "SS100-63" (Shinsei Co., Ltd.)), and a plant growth promoter shown in Table 2 was added so as to be 0.1 parts by mass with respect to 100 parts by mass of soil. Further, water was added so as to be 20 mass % with respect to the soil, and after stirring for about 5 minutes, the obtained mixture was taken as the soil sample.

A soil sample (900 g) was placed in a polyethylene pot for seedlings (diameter 12 cm). The pot was left outdoors, and 500 L/a of water was sprayed using natural water and a garden master sprayer (manufactured by KOSHIN) every two days. After 3 weeks, the hardness of the soil sample was measured. The hardness of the soil sample was measured using a Yamanaka-type soil hardness tester (Fujiwara Scientific Co., Ltd: standard soil hardness tester No. 351).

In accordance with the instruction manual of the soil hardness tester, the tip cone of the soil hardness tester was inserted until the surface of the soil sample contacted the brim, and then slowly pulled out. The reading of the scale (mm) at that time was read and calculated as a load bearing strength (kg/cm$^2$) by the following formula. Table 2 shows the average value of 5 repetitions with the load bearing strength as soil hardness.

$$P=[100X]/[0.7952(40-X)^2]$$

P: Load bearing strength (kg/cm$^2$)
X: Reading (mm)

TABLE 1

| | | | | plant yield enhancer | | | | | | | |
|---|---|---|---|---|---|---|---|---|---|---|---|
| | | | | lignocellulosic biomass (A) | | | | base (B) | | | |
| | | | | | treatment conditions | | | | | | amount of |
| | | symbol | type | amount of aqueous NaOH solution added (parts by mass) | amount of NaOH added (parts by mass) | temperature (° C.) | treatment time (h) | type | amount added with respect to (A) (parts by mass) | contact angle with water (°) | plant yield enhancer added with respect to soil (parts by mass) | soil granulated material water resistance (seconds) |
| Comparative Example | 1-1 | none | — | — | — | — | — | — | — | — | — | 27 |
| | 1-2 | comparative product 1 | calcium lignin sulfate | — | — | — | — | — | — | — | 0.1 | 18 |
| | 1-3 | comparative product 2 | — | — | — | — | — | rosin | — | 75.7 | 0.01 | 41 |
| | 1-4 | comparative product 3 | bagasse | 400 | 6.4 | 100 | 1.0 | — | — | 55.7 | 0.1 | 36 |
| | 1-5 | comparative product 4 | bagasse | — | — | — | — | rosin | 0.1 | 120.9 | 0.1 | 40 |
| | 1-6 | comparative product 5 | bagasse | 400 | 6.4 | 100 | 1.0 | methyl stearate | 1.0 | 86.8 | 0.1 | 59 |
| | 1-7 | comparative product 6 | bagasse | 400 | 6.4 | 100 | 1.0 | capric acid | 1.0 | 54.5 | 0.1 | 53 |
| | 1-8 | comparative product 7 | bagasse | 400 | 6.4 | 100 | 1.0 | octyl alcohol | 1.0 | 57.2 | 0.1 | 52 |
| | 1-9 | comparative product 8 | bagasse | 400 | 6.4 | 100 | 1.0 | polyvinyl alcohol (Mw 108,000) | 1.0 | 68.5 | 0.1 | 60 |
| | 1-10 | comparative product 9 | bagasse | 400 | 6.4 | 100 | 1.0 | polyacrylic acid (Mw 250,000) | 1.0 | 63.6 | 0.1 | 54 |
| Example | 1-1 | inventive product 1 | bagasse | 400 | 6.4 | 100 | 1.0 | rosin | 0.1 | 39.4 | 0.1 | 221 |
| | 1-2 | inventive product 1 | bagasse | 400 | 6.4 | 100 | 1.0 | rosin | 0.05 | 59.6 | 0.1 | 158 |
| | 1-3 | inventive product 1 | bagasse | 400 | 6.4 | 100 | 1.0 | rosin | 0.01 | 63.8 | 0.1 | 127 |
| | 1-2 | inventive product 2 | bagasse | 400 | 6.4 | 100 | 1.0 | rosin | 1.0 | 61.4 | 0.1 | 225 |
| | 1-3 | inventive product 3 | bagasse | 400 | 3.2 | 100 | 1.0 | rosin | 10.0 | 71.8 | 0.1 | 147 |
| | 1-4 | inventive product 4 | bagasse | 400 | 1.6 | 100 | 1.0 | rosin | 10.0 | 71.1 | 0.1 | 186 |
| | 1-5 | inventive product 4 | bagasse | 400 | 1.6 | 100 | 1.0 | rosin | 10.0 | 71.1 | 0.075 | 165 |
| | 1-6 | inventive product 5 | bagasse | 400 | 1.6 | 120 | 1.0 | rosin | 10.0 | 71.1 | 0.05 | 203 |
| | 1-7 | inventive product 5 | bagasse | 400 | 1.6 | 120 | 1.0 | rosin | 10.0 | 71.1 | 0.025 | 226 |
| | 1-8 | inventive product 5 | bagasse | 400 | 1.6 | 120 | 1.0 | rosin | 10.0 | 71.1 | 0.01 | 117 |
| | 1-9 | inventive product 6 | bagasse | 400 | 1.6 | 120 | 2.0 | rosin | 10.0 | 67.5 | 0.05 | 163 |
| | 1-10 | inventive product 7 | rice straw | 400 | 6.4 | 100 | 1.0 | rosin | 0.1 | 71.4 | 0.1 | 198 |

TABLE 1-continued

| | | | plant yield enhancer | | | | | | | |
|---|---|---|---|---|---|---|---|---|---|---|
| | | | lignocellulosic biomass (A) | | | | base (B) | | amount of | |
| | | | treatment conditions | | | | | | | |
| | symbol | type | amount of aqueous NaOH solution added (parts by mass) | amount of NaOH added (parts by mass) | temperature (° C.) | treatment time (h) | type | amount added with respect to (A) (parts by mass) | contact angle with water (°) | plant yield enhancer added with respect to soil (parts by mass) | soil granulated material water resistance (seconds) |
| 1-11 | inventive product 8 | bagasse | 400 | 6.4 | 100 | 1.0 | decyl alcohol | 1.0 | 58.3 | 0.1 | 135 |
| 1-12 | inventive product 9 | bagasse | 400 | 6.4 | 100 | 1.0 | palmityl alcohol | 1.0 | 62.6 | 0.1 | 192 |
| 1-13 | inventive product 10 | bagasse | 400 | 6.4 | 100 | 1.0 | stearyl alcohol | 1.0 | 70.4 | 0.1 | 189 |
| 1-14 | inventive product 11 | bagasse | 400 | 6.4 | 100 | 1.0 | capric acid | 1.0 | 62.4 | 0.1 | 146 |
| 1-15 | inventive product 12 | bagasse | 400 | 6.4 | 100 | 1.0 | myristic acid | 1.0 | 65.7 | 0.1 | 193 |
| 1-16 | inventive product 13 | bagasse | 400 | 6.4 | 100 | 1.0 | stearic acid | 1.0 | 68.7 | 0.1 | 234 |
| 1-17 | inventive product 14 | bagasse | 400 | 6.4 | 100 | 1.0 | polyvinyl alcohol (Mw 6,000) | 1.0 | 58.0 | 0.1 | 166 |
| 1-18 | inventive product 15 | bagasse | 400 | 6.4 | 100 | 1.0 | polyacrylic acid (Mw 5,000) | 1.0 | 67.9 | 0.1 | 208 |
| 1-19 | inventive product 16 | bagasse | 400 | 6.4 | 100 | 1.0 | glycerin | 1.0 | 64.1 | 0.1 | 201 |
| 1-20 | inventive product 17 | bagasse | 400 | 6.4 | 100 | 1.0 | sodium-lauryl sulfate | 1.0 | 47.9 | 0.1 | 176 |
| 1-21 | inventive product 18 | bagasse | 400 | 6.4 | 100 | 1.0 | dodecyl amine | 1.0 | 65.8 | 0.1 | 172 |

Some components in the table are as follows.
Polyvinyl alcohol (Mw 108,000): Weight average molecular weight 108,000, manufactured by Wako Pure Chemical Industries, Ltd.
Polyacrylic acid (Mw 250,000): Weight average molecular weight 250,000, manufactured by Wako Pure Chemical Industries, Ltd.
Polyvinyl alcohol (Mw 6,000): Weight average molecular weight 6,000, manufactured by Polysciences Inc.
Polyacrylic acid (Mw 5,000): Weight average molecular weight 5,000, manufactured by Wako Pure Chemical Industries, Ltd.

TABLE 2

| | | | plant yield enhancer | | | | | | | | | |
|---|---|---|---|---|---|---|---|---|---|---|---|---|
| | | | lignocellulosic biomass (A) | | | | base (B) | | | | | |
| | | | treatment conditions | | | | | amount | | | | |
| | symbol | type | amount of aqueous NaOH solution added (parts by mass) | amount of NaOH added (parts by mass) | temperature (° C.) | treatment time (h) | Type | added with respect to (A) (parts by mass) | contact angle with water (°) | amount of plant yield enhancer added with respect to soil (parts by mass) | mass of soybean below ground (relative value) | soil hardness (kg/cm²) |
| Comparative Examples | 2-1 | none | — | — | — | — | — | — | — | — | — | 100 | 1.25 |
| | 2-2 | comparative product 1 | calcium lignin sulfate | — | — | — | — | — | — | — | 0.1 | 105 | 0.73 |
| | 2-3 | comparative product 3 | bagasse | 400 | 6.4 | 100 | 1 | — | — | 55.7 | 0.1 | 99 | 0.72 |
| Examples | 2-1 | inventive product 3 | bagasse | 400 | 3.2 | 100 | 1.0 | rosin | 1.0 | 71.8 | 0.1 | 121 | 0.30 |

In Tables 1 and 2, the amount of base (B) added is represented as parts by mass with respect to 100 parts by mass of lignocellulosic biomass (A).

The invention claimed is:

1. A plant growth promoter, comprising:
   a lignocellulosic biomass (A); and
   at least one base (B) selected from the group consisting of base (B1-1), base (B2-1), base (B2-2), base (B2-3), base (B2-4), base (B3-1), and base (B3-2);
   wherein:
   the plant growth promoter has a contact angle with water of 80° or less;
   the lignocellulosic biomass (A) is a hydrophilic lignocellulosic biomass obtained by an alkali hot water treatment, in which a precursor lignocellulosic biomass is brought into contact with an alkaline medium with a pH of 9 to 14 at a temperature of 25 to 150° C. for 0.5 to 12 hours;
   the lignocellulosic biomass (A) has an average particle size of 0.1 μm to 1000 μm;
   base (B1-1): a resin acid selected from rosin, dammar resin, and tall oil fatty acids, or a salt thereof;
   base (B2-1): a fatty acid selected from capric acid, lauric acid, myristic acid, palmitic acid, stearic acid, oleic acid, linoleic acid, behenic acid, and lignoceric acid, or a salt thereof;
   base (B2-2): an alcohol selected from decyl alcohol, lauryl alcohol, myristyl alcohol, palmityl alcohol, and stearyl alcohol;
   base (B2-3): a sulfate selected from lauryl sulfate, tetradecyl sulfate, and hexadecyl sulfate, or a salt thereof;
   base (B2-4): an amine selected from dodecylamine, tetradecylamine, and stearylamine;
   base (B3-1): a polyhydric alcohol selected from glycerin, polyglycerins, and polyvinyl alcohols having a weight average molecular weight of 30,000 or less; and
   base (B3-2): a polycarboxylic acid selected from polyacrylic acids having a weight average molecular weight of 30,000 or less and carboxymethyl cellulose having a weight average molecular weight of 30,000 or less, or a salt thereof.

2. The plant growth promoter according to claim 1, comprising a complex of the lignocellulosic biomass (A) and the base (B).

3. The plant growth promoter according to claim 1, comprising a complex in which the base (B) is attached to a surface of the lignocellulosic biomass (A).

4. The plant growth promoter according to claim 1, wherein the base (B) and the lignocellulosic biomass (A) are present in the plant growth promoter at a mass ratio, (B):(A), of 0.001:100 to 100:100.

5. The plant growth promoter according to claim 1, which is a solid.

6. A method for producing the plant growth promoter according to claim 1, comprising:
   bringing a precursor lignocellulosic biomass into contact with an alkaline medium with a pH of 9 to 14 at a temperature of 25 to 150° C. for 0.5 to 12 hours to obtain a hydrophilic lignocellulosic biomass (A); and
   mixing the hydrophilic lignocellulosic biomass (A) with at least one base (B) selected from the group consisting of base (B1-1), base (B2-1), base (B2-2), base (B2-3), base (B2-4), base (B3-1), and base (B3-2);
   wherein:
   base (B1-1): a resin acid selected from rosin, dammar resin, and tall oil fatty acids, or a salt thereof;
   base (B2-1): a fatty acid selected from capric acid, lauric acid, myristic acid, palmitic acid, stearic acid, oleic acid, linoleic acid, behenic acid, and lignoceric acid, or a salt thereof;
   base (B2-2): an alcohol selected from decyl alcohol, lauryl alcohol, myristyl alcohol, palmityl alcohol, and stearyl alcohol;
   base (B2-3): a sulfate selected from lauryl sulfate, tetradecyl sulfate, and hexadecyl sulfate, or a salt thereof;
   base (B2-4): an amine selected from dodecylamine, tetradecylamine, and stearylamine;
   base (B3-1): a polyhydric alcohol selected from glycerin, polyglycerins, and polyvinyl alcohols having a weight average molecular weight of 30,000 or less; and
   base (B3-2): a polycarboxylic acid selected from polyacrylic acids having a weight average molecular weight of 30,000 or less and carboxymethyl cellulose having a weight average molecular weight of 30,000 or less, or a salt thereof.

7. The method for producing a plant growth promoter according to claim 6, wherein the alkaline medium comprises water.

8. A method for growing a plant, wherein the plant is cultivated in a soil containing the plant growth promoter according to claim 1.

9. The method for growing a plant according to claim 8, wherein the plant growth promoter is added to the soil before sowing.

10. The method for growing a plant according to claim 8, wherein the plant growth promoter is mixed into the soil or sprayed onto the soil.

11. The method for growing a plant according to claim 8, wherein the plant growth promoter is added, in total of the lignocellulosic biomass (A) and the base (B), in an amount of 0.0001 parts by mass or more and 10 parts by mass or less per 100 parts by mass of the soil for cultivating the plant.

12. The method for growing a plant according to claim 8, wherein the plant growth promoter is sprayed, in total of the lignocellulosic biomass (A) and the base (B), in an amount of 0.2 kg or more and 20,000 kg or less per 10a of the soil for cultivating the plant.

13. The method for growing a plant according to claim 11, wherein the plant is a plant used as an agricultural crop.

14. The method for growing a plant according to claim 8, wherein the plant is a plant selected from Cucurbitaceae, Solanaceae, Rosaceae, Malvaceae, Leguminosae, Gramineae, Brassicaceae, Alliaceae, Amaryllidaceae, Compositae, Amaranthaceae, Umbelliferae, Zingiberaceae, Lamiaceae, Araceae, Convolvulaceae, Dioscoreaceae, and Nelumbonaceae.

15. The method for growing a plant according to claim 8, wherein the plant is a plant selected from fruit and vegetables, leaf vegetables, root vegetables, rice, wheat varieties, and flowers.

16. The method for growing a plant according to claim 8, comprising aggregating the soil to obtain a soil granulated material.

* * * * *